United States Patent [19]
Cha et al.

[11] Patent Number: 6,046,376
[45] Date of Patent: Apr. 4, 2000

[54] PROCESS FOR MICROWAVE ENHANCEMENT OF GASEOUS DECOMPOSITION REACTIONS IN SOLUTIONS

[75] Inventors: Chang Yul Cha; Charles T. Carlisle, both of Laramie, Wyo.

[73] Assignee: Cha Corporation, Laramie, Wyo.

[21] Appl. No.: 09/173,348

[22] Filed: Oct. 15, 1998

Related U.S. Application Data

[63] Continuation-in-part of application No. 09/064,266, Apr. 22, 1998.

[51] Int. Cl.[7] .............................. A62D 3/00; C07C 1/00; C01B 1/00
[52] U.S. Cl. .................. 588/238; 588/243; 204/157.15; 204/158.2
[58] Field of Search .......................... 204/157.15, 158.2; 588/243, 238

[56] References Cited

U.S. PATENT DOCUMENTS

| | | | |
|---|---|---|---|
| 4,076,606 | 2/1978 | Suzuki et al. | 204/157.1 R |
| 4,671,951 | 6/1987 | Masse | 423/531 |
| 5,256,265 | 10/1993 | Cha | 204/157.3 |
| 5,451,302 | 9/1995 | Cha | 204/157.15 |

OTHER PUBLICATIONS

N. Cook, Microwave Principles and Systems, Prentice–Hall Inc. Englewood Cliffs, NJ 07632, 1986. No month available.

Kirk–Othmer, Encyclopedia of Chemical Technology, 3rd Ed., Supplement Volume, Plasma Technology, pp599–608, John Wiley and Sons, NY no date available.

Kirk–Othmer, Encyclopedia of Chemical Technology, 3rd Ed., vol. 15, Microwave Technology, pp 494–522, John Wiley and Sons, NY no date available.

H. Haynes, Solution Mining of Trona, In Situ, 21(4), pp 357–394 (1997). No month available.

*Primary Examiner*—Edna Wong
*Attorney, Agent, or Firm*—John O. Mingle

[57] ABSTRACT

Gaseous decomposition from a solution is enhanced in the presence of activated carbon or its equivalent by radiofrequency energy in the microwave range. An important example is wet calcination using solutions containing bicarbonates, such as trona, where good conversion to carbonate is readily obtained. A further example is the excellent stabilization of solutions containing sulfites and bisulfites.

16 Claims, 3 Drawing Sheets

PROCESS FOR MICROWAVE ENHANCEMENT OF GASEOUS DECOMPOSITION REACTIONS IN SOLUTIONS

This application is a continuation-in-part of application Ser. No. 09/064,266, filed Apr. 22, 1998, pending whose specification is hereby incorporated by reference.

BACKGROUND OF INVENTION

1. Field of Invention

The present invention relates to a process using radiofrequency microwave energy to enhance gaseous releases from solutions, such as performing wet calcination and its analogues.

2. Background

Wet calcination is a common procedure to process ores containing bicarbonates where the desired products are carbonates. It has been applied to the processing of trona ores whose chemical composition is largely $Na_2CO_3 \cdot NaHCO_3 \cdot 2H_2O$, and where the desirable product is soda ash, $Na_2CO_3$, since this is a valuable industrial chemical.

The common processing of trona ore proceeds with a material size reduction of the ore which is then treated in solution either by other chemicals or heat or both to break down the bicarbonate. Further selective crystallization is employed to purify the final soda ash.

Trona is normally mined in a conventional manner producing an ore containing various impurities which after conventional material size treatment is then dissolved into a water solution for purification by crystallization. However future efforts are likely to employ solution mining underground and eliminate the conventional mining costs and problems. Thus a water solution of trona is directly available to begin the processing steps.

An excellent treatise of the procedures and problems associated with modern trona mining and processing is by H. W. Haynes, Jr., *Solution Mining of Trona, IN SITU*, 214(4), 357–394 (1997), which is hereby incorporated by reference, and is hereafter referred to as Haynes.

The preferred treatment of the bicarbonate in trona is to decompose it into soda ash, and since sodium carbonate is produced, the procedure is often called calcination and the equipment a calciner. The basic reaction is:

$$2\,NaHCO_3 \rightarrow Na_2CO_3 + CO_2 + H_2O \qquad (1)$$

Thermodynamically this reaction takes a minimum of 70° C. but to obtain a reasonable rate of reaction temperatures from 150 to 200° C. are employed in the calciner. However for trona ores often higher temperatures than about 200° C. are not feasible to further enhance the desired reaction as the various impurities, such as silicon dioxide, react with the soda ash producing undesirable byproducts, such as sodium silicates. Thus trona calciner temperature below 200° C. are utilized resulting in long processing times. However by leaching of the trona before calcination the silicon dioxide is largely eliminated allowing increased flexibility. A number of solution problems in obtaining and purifying such soda ash are well documented by Haynes.

The analogues of wet calcination consist of solution chemical decomposition reactions where one of the important reaction products is a gas. For wet calcination the product was carbon dioxide which is released upon the decomposition of bicarbonates. A similar process occurs when sulfur dioxide is released upon the decomposition of bisulfite.

The importance of the decomposition of bisulfites occurs because of the hazardous nature of sulfur dioxide so it is not freely released into the atmosphere. Solutions of sodium sulfite and sodium bisulfite are produced when solutions of soda ash, sodium carbonate, or its equivalent such as trona mine water, are utilized as a scrubbing agent to remove sulfur dioxide from flue gases. The sodium sulfite is stable but the sodium bisulfite slowly releases sulfur dioxide into the atmosphere, and this is undesirable. Therefore for the stabilization of these solutions it is necessary to convert the bisulfite to sulfite under controlled conditions where the released sulfur dioxide is contained.

The reaction is:

$$2\,NaHSO_3 \rightarrow Na_2SO_3 + SO_2 + H_2O \qquad (2)$$

This is the analogue of Eq.(1) with the atom sulfur replacing the atom carbon.

The primary purpose of the subject invention is to enhance the rates of Eq.(1) and Eq.(2) and other analogues by the use of microwaves.

Quantum radiofrequency (RF) physics is based upon the phenomenon of resonant interaction with matter of electromagnetic radiation in the microwave and RF regions since every atom or molecule can absorb, and thus radiate, electromagnetic waves of various wavelengths. The rotational and vibrational frequencies of the electrons represent the most important frequency range. The electromagnetic frequency spectrum is usually divided into ultrasonic, microwave, and optical regions. The microwave region is from 300 megahertz (MHz) to 300 gigahertz (GHz) and encompasses frequencies used for much communication equipment. For instance, refer to Cook, *Microwave Principles and Systems*, Prentice-Hall, 1986.

Often the term microwaves or microwave energy is applied to a broad range of radiofrequency energies particularly with respect to the common heating frequencies, 915 MHz and 2450 MHz. The former is often employed in industrial heating applications while the latter is the frequency of the common household microwave oven and therefore represents a good frequency to excite water molecules. In this writing the term "microwaves" is generally employed to represent "radiofrequency energies selected from the range of about 500 to 5000 MHz", since in a practical sense this total range is employable for the subject invention.

The absorption of microwaves by the energy bands, particularly the vibrational energy levels, of atoms or molecules results in the thermal activation of the nonplasma material and the excitation of valence electrons. The nonplasma nature of these interactions is important for a separate and distinct form of heating employs plasma formed by arc conditions of a high temperature, often more than 1650° C., and at much reduced pressures or vacuum conditions. For instance, refer to Kirk-Othmer, *Encyclopedia of Chemical Technology*, 3rd Edition, Supplementary Volume, pages 599–608, Plasma Technology. In microwave technology, as applied in the subject invention, neither condition is present and therefore no plasmas are formed.

Microwaves lower the effective activation energy required for desirable chemical reactions since they can act locally on a microscopic scale by exciting electrons of a group of specific atoms in contrast to normal global heating which raises the bulk temperature. Further this microscopic interaction is favored by polar molecules whose electrons become easily locally excited leading to high chemical activity; however, nonpolar molecules adjacent to such polar molecules are also affected but at a reduced extent. An example is the heating of polar water molecules in a common household microwave oven where the container is of nonpolar material, that is, microwave-passing, and stays relatively cool.

In this sense microwaves are often referred to as a form of catalysis when applied to chemical reaction rates. For instance, refer to Kirk-Othmer, *Encyclopedia of Chemical Technology*, 3rd Edition, Volume 15, pages 494–517, Microwave Technology.

Related United States microwave patents include:

| U.S. Pat. No. | Inventor | Year |
|---|---|---|
| 4,076,606 | Suzuki et al. | 1978 |
| 4,671,951 | Masse | 1987 |
| 5,451,302 | Cha | 1995 |

Referring to the above list, Suzuki et al. disclose a process for decomposing $NO_x$ in a gaseous medium using microwave energy. However the subject invention while performing a decomposition reaction using microwaves employs a water medium.

Masse discloses purifying liquid sulfuric acid by the evaporation of water employing microwave energy. The subject invention does not involve such a purification process but does employ a microwave cavity reactor.

Cha discloses a process of microwave catalysis of chemical reactions using waveguide liquid films. The concentration of phosphoric acid by removal of bound water and the release of carbon dioxide from pregnant solutions of monoethanolamine are shown. However the subject invention does not utilize such a waveguide liquid film which requires a microwave-passing substrate.

SUMMARY OF INVENTION

The objectives of the present invention include overcoming the above-mentioned deficiencies in the prior art and providing a potentially economically viable process for the microwave enhancement of wet calcination and its analogues.

Gaseous decomposition from a solution is enhanced in the presence of activated carbon or its equivalent by radiofrequency energy in the microwave range.

DETAILED DESCRIPTION OF INVENTION

Microwaves are a versatile form of energy that is applicable to enhance chemical reactions since the energy is locally applied by its largely vibrational absorption by polar molecules and does not produce plasma conditions. Particularly reactions that proceed by free-radical mechanisms are often enhanced to higher rates because their initial equilibrium thermodynamics is unfavorable. A second class of enhanced reactions are those whose reaction kinetics appear unfavorable at desirable bulk temperature conditions.

Carbonaceous material is an excellent microwave absorber since it has a wide range of polar impurities that readily interact with such radiofrequency energy especially in vibrational modes. Consequently the microwave waveguide design for the microwave cavity is not usually critical. Carbonaceous material for use with the subject invention commonly comprises activated carbon, char, soot, pyrolytic carbon, carbon black, activated charcoal, and metal carbides, especially silicon carbide. In most instances activated carbon is the preferred material to employ with a water medium under ambient temperature and pressure conditions, although activated charcoal, if readily available, is likely more cost effective.

The microwave excitation of the molecules of the carbonaceous material also excites any constituents which have been adsorbed on the internal pore surfaces of the carbonaceous material and produces a highly reactive surface pore condition. Gaseous interchange with the pore surface occurs in close proximity or within the surface boundary layer of the carbon surface through chemisorption, absorption, adsorption, or diffusion. In the subject invention the primary gaseous interchange is by various gases leaving the surface.

Figure 1:
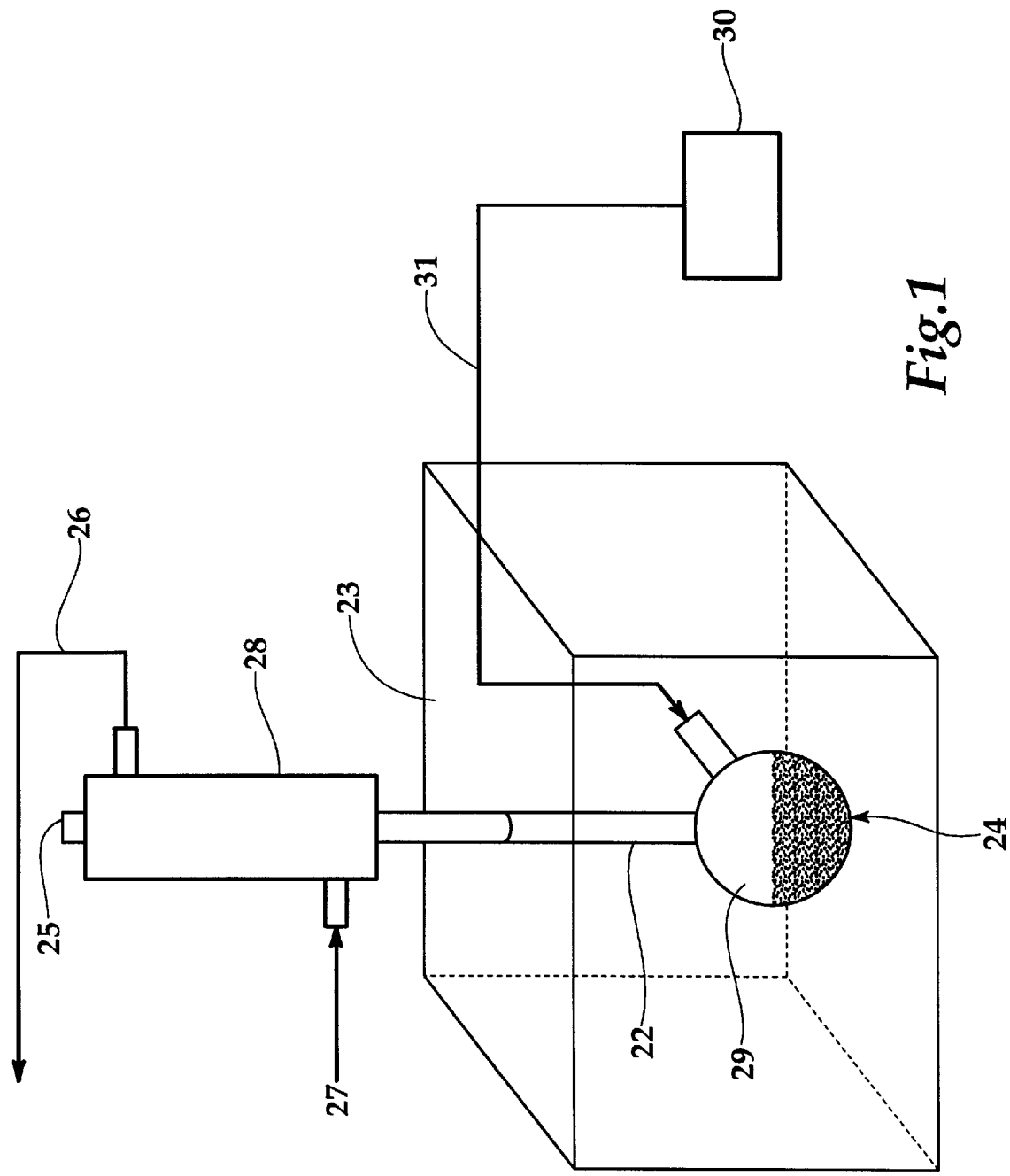
FIG. 1 shows a batch laboratory system for wet calcination and its analogues operating within a microwave oven.

A typical laboratory microwave reactor system to study experimental conditions for the subject invention is shown in FIG. 1. It is setup for wet calcination, but by catching the overhead condensed liquid separately instead of refluxing it, various analogue reactions to calcination are performed. A standard microwave energy oven 23 of 900 Watts with a frequency of 2450 MHz was slightly modified to allow external attachments. A 1000 ml laboratory round bottom glass flask or retort 29 was employed filled approximately one-third with activated carbon 24 while an access line 31 fed bleeder gas into the side of the retort 29 coming from an external supply 30. Water containing bicarbonates was placed in the retort 29 which extended into a reflux condenser 28 fed with cooled water 27 going into and slightly warmer water 26 out. The condensed liquid returned via the neck surface 22 to the retort 29 while the bleeder gas 25 generated passed out the condenser 28. In use this batch system ran for a fixed time with liquid samples from the retort 29 taken and analyzed for bicarbonate at the beginning and end of each run. Alternately the bleeder gas 31 is conventionally analyzed for its $CO_2$ content. Further the input bleed gas ideally contains no carbon dioxide so the best mode is something like nitrogen; however, under high bleed gas flow conditions air, which does contain some carbon dioxide, is acceptable.

Figure 2:
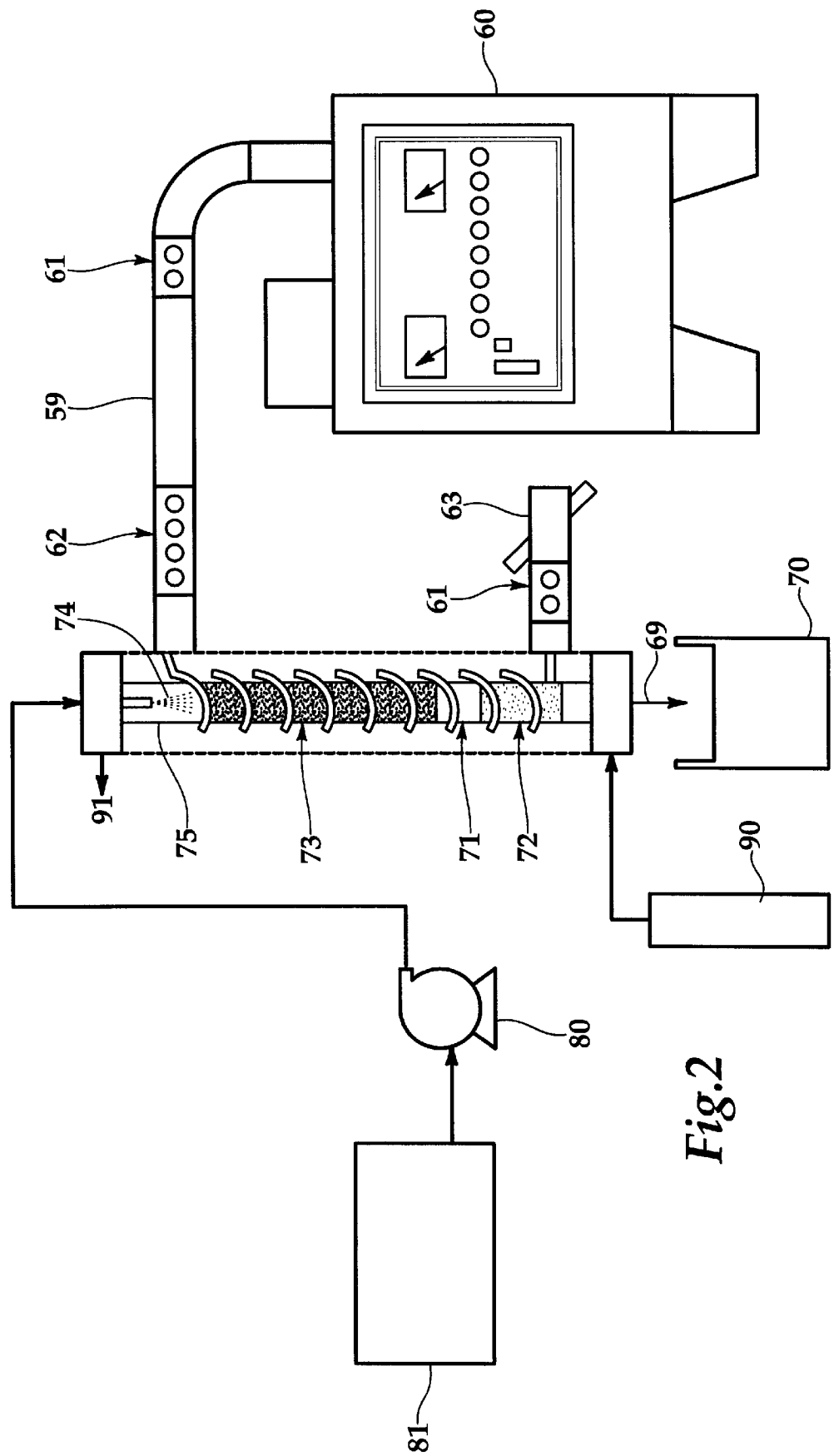
FIG. 2 shows a flow process for microwave enhancement of gaseous decomposition reactions.

FIG. 2 shows a typical flow process for wet calcination built into the waveguide, a microwave cavity, fed by a microwave generator. The microwave generator 60 is capable of six kilowatts of radiofrequency energy at a frequency of 2450 MHz. Two 60 dB couplers 61 are located toward the end of the waveguide 59 which has a common tuner 62. A water terminator 63 ends the waveguide 59. The reactor column 75 made of quartz, which is microwave-passing, is contained within the waveguide 59. This reactor has doughnut supports 71 to physically stabilize the column 75 which is packed with approximately one foot of carbonaceous material 73 that readily absorbs microwave energy. The bottom of the reactor column 75 has a ceramic packing 72 acting as a filter. The bicarbonate containing water 81 is stored and then pumped 80 into the top of the column 75 where a sprayer 74 distributes the water over the carbonaceous bed 73 giving trickle down flow. The microwave enhanced wet calcination liquid 69 discharges from the bottom of the column 75 into a receiving tank 70. A countercurrent flow of bleeder gas 90, such as steam or nitrogen, efficiently removes 91 the generated carbon dioxide. Again for use with an analogue reaction to calcination the overhead vapor 91 is condensed and collected. Further the use of a bleed gas is optional if sufficient vapor is produced to easily remove the reaction gaseous product away from the reacting surface.

EXAMPLE 1

The experimental setup as shown in FIG. 1 was employed to determine the efficiency of the calcination of sodium bicarbonate in solution by microwave enhanced wet calcination. The tests utilized 5–25 wt % solutions of NaHCO3 and 5 and 10% activated carbon. The bleeder gas was nitrogen at approximately 20 ml/min. In each test the solution of known bicarbonate concentration and activated carbon were placed in the flask or retort reactor and exposed to microwaves for a fixed time period, up to 10 minutes. At the end of the reaction time the bicarbonate concentration of the solution was determined using the ASTM E359-95 procedure. Alternatively the concentration of $CO_2$ in the leaving bleeder gas was determined.

Figure 3:
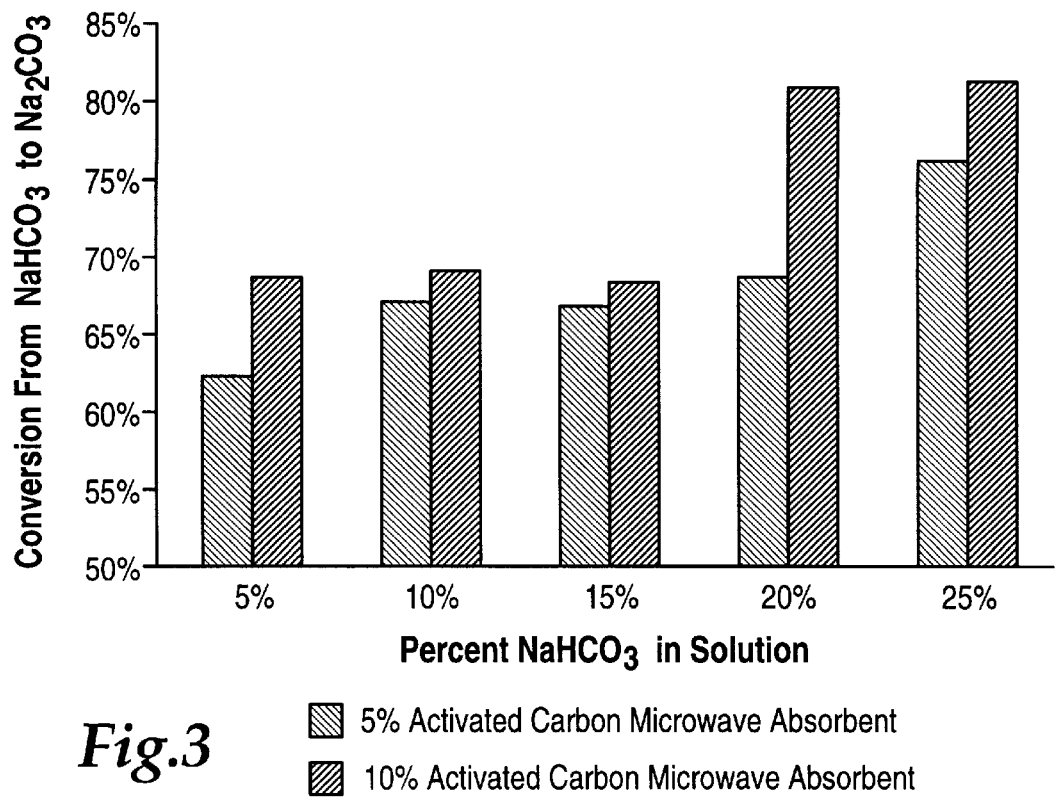
FIG. 3 shows a bar graph of the conversion by microwave induced wet calcination of sodium bicarbonate.

FIG. 3 shows the results of a number of these tests and indicates a best conversion level of over 80 percent with 10% activated carbon using a microwave power of approximately 600 Watts at 2450 MHz.

Using this setup without microwaves essentially produced negligible change in bicarbonate concentration.

EXAMPLE 2

A second series of tests was employed using the continuous reactor of FIG. 2 with about 85° C. mine water trona solutions averaging $Na_2CO_3$, 14.10%, and $NaHCO_3$, 4.19%. Approximately greater than 50% one-pass conversion of $NaHCO_3$ occurred with microwave powers of near 800 Watts at 2450 MHz and liquid to gas ratios near 2.0.

EXAMPLE 3

Figure 4:
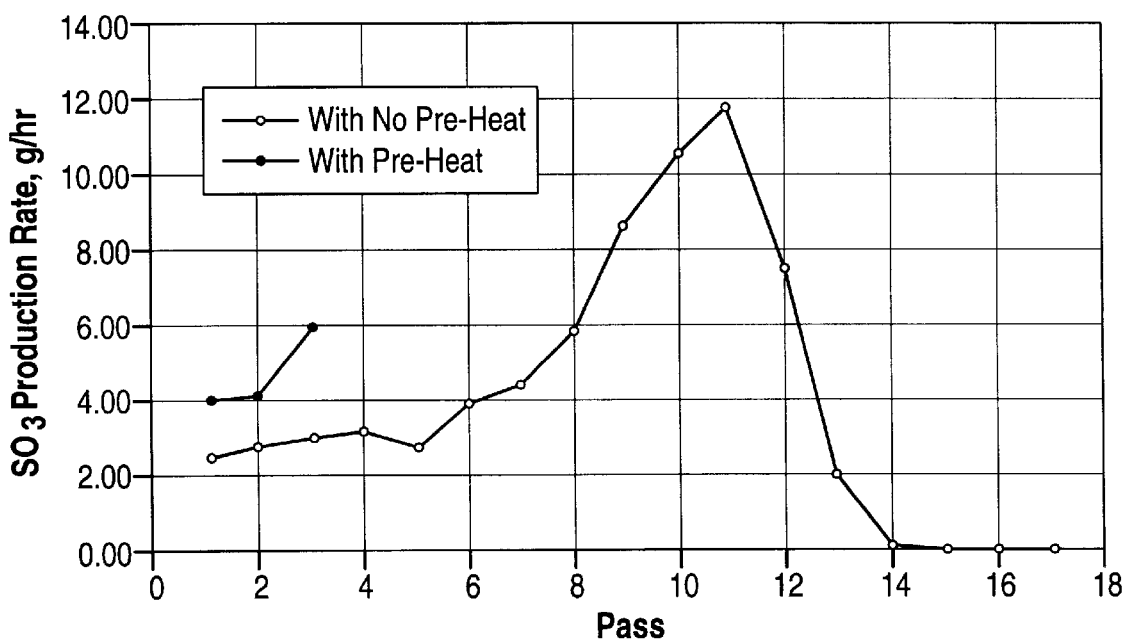
FIG. 4 shows a graph of the microwave enhanced release of sulfur dioxide from sodium bisulfite solutions.

One important analogue reaction to calcination is "sulfitination" where the bisulfite releases $SO_2$ and water. The feed liquid for the process of FIG. 2 was designed to be similar to scrubber water from flue gas desulfurization with approximately equal concentrations of five percent by weight of $Na_2SO_3$ and $NaHSO_3$. The residence time through the test reactor was about 30 seconds. For this test the bleed gas was oxygen and the overhead was condensed with the liquid returning and the overhead gas tested by a conventional sulfur dioxide measuring instrument. The carbonaceous material was silicon carbide of about eight mesh while the microwave power was 800 Watts at 2450 MHz. The results are shown in FIG. 4 where a preheated liquid feed was employed for a few preliminary runs but was terminated after three passes due to an equipment breakdown. After 14 passes without preheating all the sodium bisulfite was reacted as the further release of sulfur dioxide gas became near zero.

The general analogue case for the subject invention's microwave enhanced decomposition in solution, using for convenience the sodium salt, is represented by:

$$2\ NaHZ \rightarrow Na_2Z_1 + G \quad (3)$$

where Z is compound ion of valence two, $Z_1$ is a decomposed ion of valence two, and G is one or more gaseous decomposition products of Z including likely water. For instance, the common food additive monosodium glutimate (MSG) fits this analogue where one possible decomposition in a water solution is:

$$2\ NaHC_5H_7NO_4 \longrightarrow Na_2CO_3 + 2NH_3 + 3CO + 3C_2H_2 + H_2 + 2H_2O \quad (4)$$

Other salts than sodium are entirely usable in Eq.(3), but sodium is a convenient one for water solutions since most sodium salts are quite water soluble. When MSG is utilized in either the batch process of FIG. 1 or the continuous process of FIG. 2, any bleed gas is normally restricted to something other than the product gases of Eq.(4) or similar gaseous collections if other stoichiometric decompositions occur; however, air and steam are potentially useable.

A process for gaseous decomposition of a solution containing a salt analogue of calcination comprising dispersing said solution throughtout a bed of carbonaceous material and exposing said bed to microwaves. Alternately the bed may contain a bleed gas which has no substantial amount of any gas released by said gaseous decomposition. The solution containing a salt analogue of calcination is selected from the group consisting of bicarbonates, bisulfites, and any other ion of at least valence two comprising components that decompose into gases. The solution is optionally supplied by a spraying system over said bed of carbonaceous material, while the microwaves represent radiofrequency energy selected from the range consisting of 500 to 5000 Mhz. The carbonaceous material is selected from the group consisting of activated carbon, char, soot, pyrolytic carbon, carbon black, activated charcoal, and metal carbides, while the bed is selected from the group consisting of fluidized beds, fixed beds, semi-fluidized beds, suspended beds, and moving beds.

A process for wet calcination of a solution containing bicarbonates comprising dispersing said solution containing bicarbonates throughout a bed, which is selected from the group consisting of fluidized beds, fixed beds, semi-fluidized beds, suspended beds, and moving beds, of carbonaceous material, which is further selected from the group consisting of activated carbon, char, soot, pyrolytic carbon, carbon black, activated charcoal, and silicon carbide; and exposing said bed to microwaves selected from the frequency range consisting essentially of 500 to 5000 Mhz. Optionally the bed contains a bleed gas comprised of no substantial amount of carbon dioxide. The bicarbonates may comprise trona, and the solution containing bicarbonates may comprise trona mine water, and further the solution is optionally supplied by a spraying system.

A process for stabilization of a solution containing bisulfites comprising dispersing said solution containing bisulfites throughout a bed, which is selected from the group consisting of fluidized beds, fixed beds, semi-fluidized beds, suspended beds, and moving beds, of carbonaceous material, which is further selected from the group consisting of activated carbon, char, soot, pyrolytic carbon, carbon black, activated charcoal, and silicon carbide; and exposing said bed to microwaves selected from the frequency range consisting essentially of 500 to 5000 Mhz. The bed optionally contains a bleed gas containing no substantial amount of sulfur dioxide. The solution containing bisulfites may represent flue gas desulfurization scrubbing bottoms obtained from soda ash treatment of flue gases containing sulfur dioxide and is optionally supplied by a spraying system over the bed.

The foregoing description of the specific embodiments will so fully reveal the general nature of the invention that others can, by applying current knowledge, readily modify and/or adapt for various applications such specific embodiments without departing from the generic concept, and therefore such adaptations or modifications are intended to be comprehended within the meaning and range of equivalents of the disclosed embodiments. It is to be understood that the phraseology or terminology herein is for the purpose of description and not of limitation.

We claim:

1. A process for gaseous decomposition of a solution containing a salt analogue of calcination comprising:

dispersing said solution throughout a bed of carbonaceous material; and exposing said bed to microwaves.

2. The process according to claim 1 wherein said bed further comprises a bleed gas containing no substantial amount of any gas released by said gaseous decomposition.

3. The process according to claim 1 wherein said solution containing the salt analogue of calcination is selected from the group consisting of bicarbonates, bisulfites, and any other ion of at least valence two comprising components that decompose into gases.

4. The process according to claim 1 wherein said solution further comprises being supplied by a spraying system over said bed of carbonaceous material.

5. The process according to claim 1 wherein said microwaves are radiofrequency energy selected from the range consisting of 500 to 5000 Mhz.

6. The process according to claim 1 wherein said carbonaceous material is selected from the group consisting of activated carbon, char, soot, pyrolytic carbon, carbon black, activated charcoal, and metal carbides.

7. The process according to claim 1 wherein said bed is selected from the group consisting of fluidized beds, fixed beds, semi-fluidized beds, suspended beds, and moving beds.

8. A process for wet calcination of a solution containing bicarbonates comprising:

dispersing said solution containing bicarbonates throughout a bed, which is selected from the group consisting of fluidized beds, fixed beds, semi-fluidized beds, suspended beds, and moving beds, of carbonaceous material, which is further selected from the group consisting of activated carbon, char, soot, pyrolytic carbon, carbon black, activated charcoal, and silicon carbide; and exposing said bed to microwaves selected from the frequency range consisting essentially of 500 to 5000 Mhz.

9. The process according to claim 8 wherein said bed further comprises a bleed gas containing no substantial amount of carbon dioxide.

10. The process according to claim 8 wherein said bicarbonates further comprise trona.

11. The process according to claim 8 wherein said solution containing bicarbonates further comprises trona mine water.

12. The process according to claim 8 wherein said solution further comprises being supplied by a spraying system.

13. A process for stabilization of a solution containing bisulfites comprising:

dispersing said solution containing bisulfites throughout a bed, which is selected from the group consisting of fluidized beds, fixed beds, semi-fluidized beds, suspended beds, and moving beds, of carbonaceous material, which is further selected from the group consisting of activated carbon, char, soot, pyrolytic carbon, carbon black, activated charcoal, and silicon carbide; and exposing said bed to microwaves selected from the frequency range consisting essentially of 500 to 5000 Mhz.

14. The process according to claim 13 wherein said bed further comprises a bleed gas containing no substantial amount of sulfur dioxide.

15. The process according to claim 13 wherein said solution containing bisulfites further comprises flue gas desulfurization scrubbing bottoms.

16. The process according to claim 13 wherein said solution further comprises being supplied by a spraying system.

* * * * *